(12) United States Patent
Leverett

(10) Patent No.: US 11,006,758 B1
(45) Date of Patent: May 18, 2021

(54) CHAIRBACK SUPPORT STRUCTURE

(71) Applicant: MERITS HEALTH PRODUCTS CO., LTD., Taichung (TW)

(72) Inventor: David Leverett, Ringgold, GA (US)

(73) Assignee: MERITS HEALTH PRODUCTS CO., LTD., Taichung (TW)

(*) Notice: Subject to any disclaimer, the term of this patent is extended or adjusted under 35 U.S.C. 154(b) by 0 days.

(21) Appl. No.: 16/801,639

(22) Filed: Feb. 26, 2020

(30) Foreign Application Priority Data

Jan. 15, 2020 (TW) ................. 109200584

(51) Int. Cl.
A47C 3/12 (2006.01)
A47C 7/14 (2006.01)
A47C 7/40 (2006.01)
A47C 7/46 (2006.01)

(52) U.S. Cl.
CPC .................... A47C 7/462 (2013.01)

(58) Field of Classification Search
CPC ............. A47C 7/20; A47C 7/462; A47C 3/12
USPC .......................... 297/230.12, 284.3, 452.14, 297/452.29–452.37
See application file for complete search history.

(56) References Cited

U.S. PATENT DOCUMENTS

| 4,402,548 A | * | 9/1983 | Mason | B60N 2/2884 297/464 |
| 4,647,066 A | * | 3/1987 | Walton | A47C 7/405 280/47.4 |
| 5,018,790 A | * | 5/1991 | Jay | A61G 7/05715 297/452.26 |
| 5,149,173 A | * | 9/1992 | Jay | A61G 5/12 297/284.9 |
| 5,161,522 A | * | 11/1992 | Clevenger | A61G 5/00 128/845 |
| 5,378,045 A | * | 1/1995 | Siekman | A61G 5/1043 297/452.41 |
| 5,407,248 A | * | 4/1995 | Jay | A61G 5/10 297/284.3 X |
| 5,513,899 A | * | 5/1996 | Michaels | A47C 31/126 297/452.25 X |
| 6,032,975 A | * | 3/2000 | Hanson | A61G 5/00 280/250.1 |
| 6,033,025 A | * | 3/2000 | Christofferson | A61G 5/10 297/452.36 X |
| 6,059,370 A | * | 5/2000 | Kanyer | A61G 5/10 297/452.36 X |

(Continued)

FOREIGN PATENT DOCUMENTS

| TW | M348544 | 1/2009 |
| TW | M538750 | 4/2017 |
| TW | M593848 | 4/2020 |

Primary Examiner — Rodney B White
(74) Attorney, Agent, or Firm — Muncy, Geissler, Olds & Lowe, P.C.

(57) ABSTRACT

A chairback support structure includes: a back element having a plurality of insertion holes; a plurality of resilient bend plates each having a bendable portion, two insertion portions extending from two ends of the bendable portion, respectively, and two abutting portions disposed at two ends of the bendable portion, respectively, the two insertion portions being insertable into the insertion holes of the back element, and the two abutting portions being adapted to abut against the back element; and a pad for covering the back element and the resilient bend plates.

10 Claims, 4 Drawing Sheets

(56) References Cited

U.S. PATENT DOCUMENTS

| | | | | |
|---|---|---|---|---|
| 6,257,664 B1* | 7/2001 | Chew | ............... | A47C 7/405 |
| | | | | 297/284.9 |
| 6,460,933 B1* | 10/2002 | Bors | ............... | A61G 5/1067 |
| | | | | 297/284.9 |
| 6,688,693 B2* | 2/2004 | Christofferson | ......... | A47C 7/46 |
| | | | | 297/284.3 |
| 7,559,607 B2* | 7/2009 | Archambault | ........... | B60N 2/80 |
| | | | | 297/284.3 X |
| 7,918,506 B2* | 4/2011 | Hsiao | ............... | A47C 7/462 |
| | | | | 297/284.3 |
| 8,186,756 B2* | 5/2012 | Jorgensen | ............. | A47C 7/425 |
| | | | | 297/230.12 |
| 9,216,121 B2* | 12/2015 | Galante | ................. | A61G 5/122 |
| 2005/0116525 A1* | 6/2005 | Holcomb | ............ | A61G 5/1054 |
| | | | | 297/452.29 |

* cited by examiner

US 11,006,758 B1

CHAIRBACK SUPPORT STRUCTURE

BACKGROUND OF THE INVENTION

1. Technical Field

The present disclosure relates to various chairs, such as general chairs, wheelchairs and scooters, and, more particularly, to a chairback support structure capable of providing enhanced support to a sitter's back.

2. Description of Related Art

A conventional chairback support structure has a drawback: adjustment in the position, height and curvature of the human back resting-portion of the chairback of the conventional chairback support structure is difficult. In view of this, the conventional chairback support structure still has room for improvement.

BRIEF SUMMARY OF THE INVENTION

In view of the aforesaid drawback of the prior art, it is an objective of the present disclosure to provide a chairback support structure conducive to adjustment in the position, height and curvature of the human back resting-portion of the chairback of the chairback support structure.

In order to achieve the above and other objectives, the present disclosure provides a chairback support structure, comprising: a back element having a plurality of insertion holes; a plurality of resilient bend plates each having a bendable portion, two insertion portions extending from two ends of the bendable portion, respectively, and two abutting portions disposed at two ends of the bendable portion, respectively, the two insertion portions being insertable into the insertion holes of the back element, and the two abutting portions being adapted to abut against the back element; and a pad for covering the back element and the resilient bend plates.

The resilient bend plates are each selected by a user at will and adjustably mounted on the back element to facilitate adjustment in the position, height and curvature of the human back resting-portion of the chairback of the chairback support structure, thereby achieving the objective of the present disclosure.

Preferably, the back element has a central back board and two lateral back boards extending from two lateral edges of the central back board, respectively.

Preferably, an included angle is formed between the central back board and each said lateral back board.

Preferably, the insertion holes of the back element are disposed on the central back board.

Preferably, the insertion holes of the back element are disposed on the two lateral back boards.

Preferably, the resilient bend plates are of different lengths.

Preferably, the chairback support structure further comprises a plurality of lateral support elements mounted on the back element.

Preferably, the back element has a plurality of first slots which the lateral support elements are mounted on, respectively.

Preferably, the back element further has a plurality of second slots. Each said lateral support element has a positioning post positioned at any one of the second slots of the back element.

DETAILED DESCRIPTION OF THE INVENTION

Figure 1:
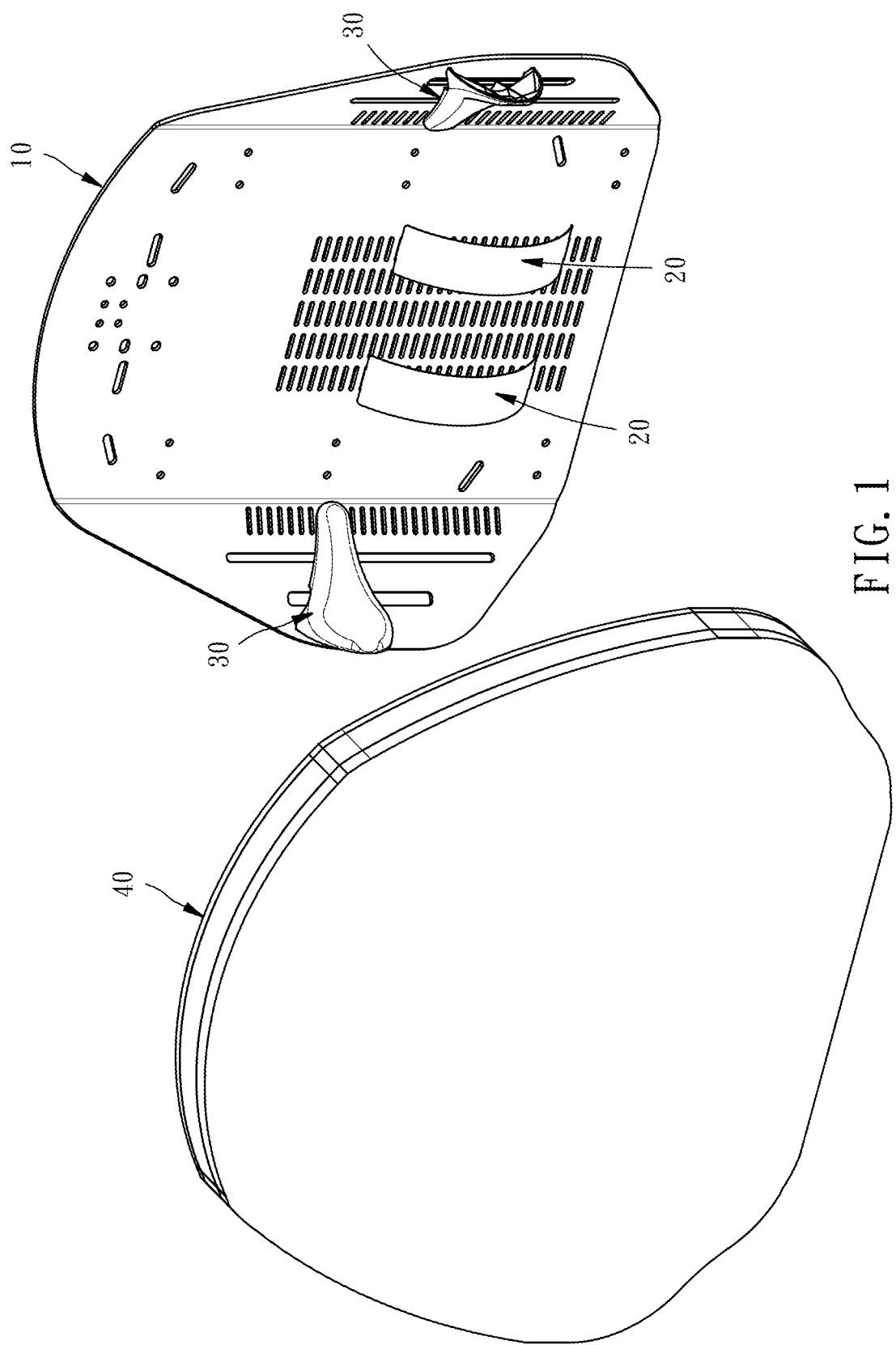
FIG. 1 is a perspective view of according to a preferred embodiment of the present disclosure.
Figure 2:
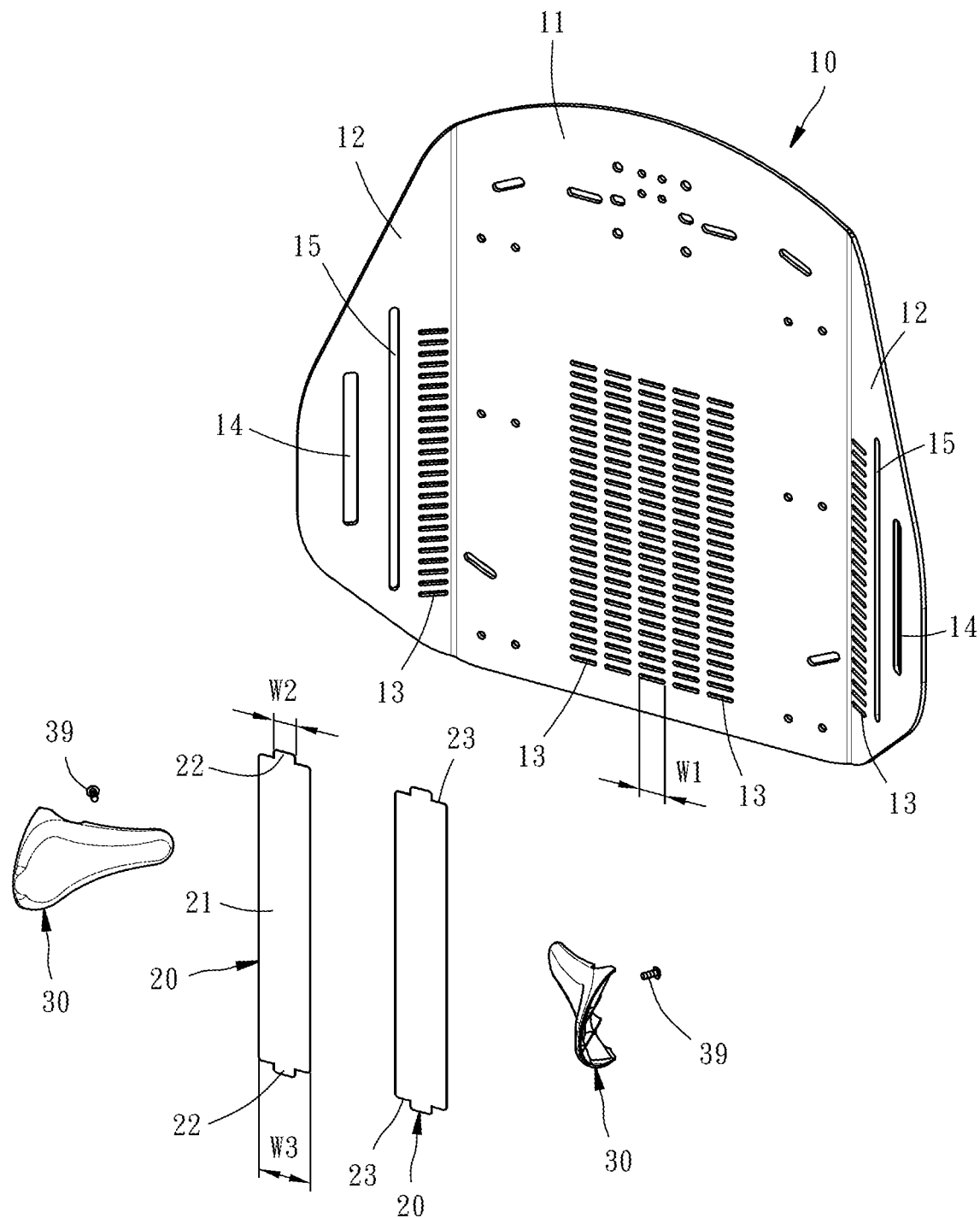
FIG. 2 is an exploded view according to a preferred embodiment of the present disclosure.
Figure 3:
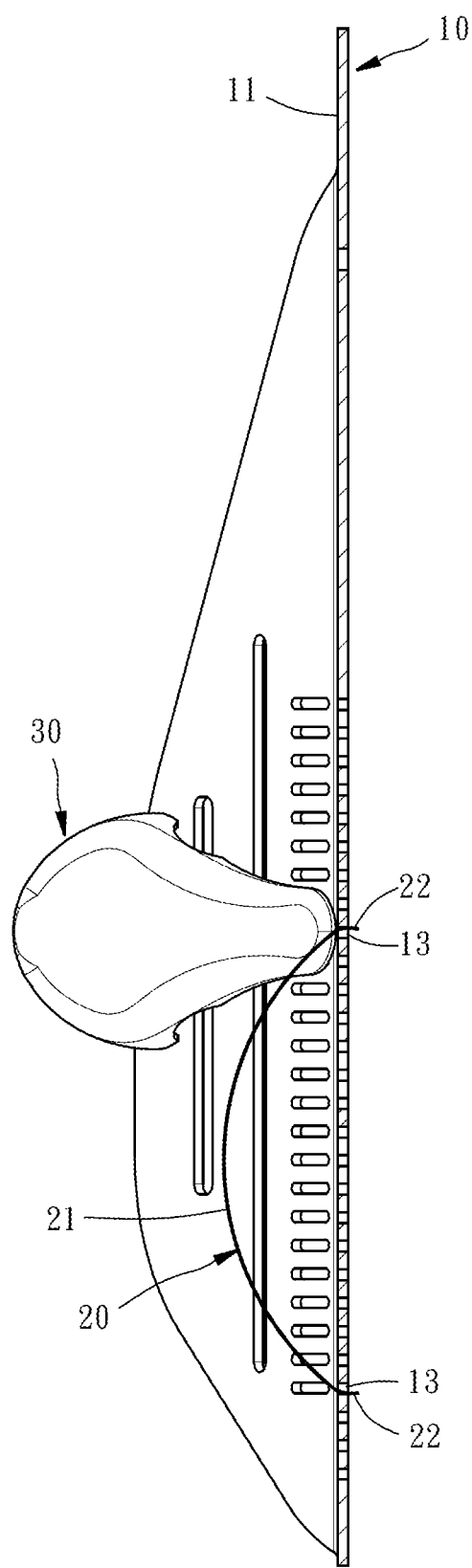
FIG. 3 is a cross-sectional view of according to a preferred embodiment of the present disclosure.
Figure 4:
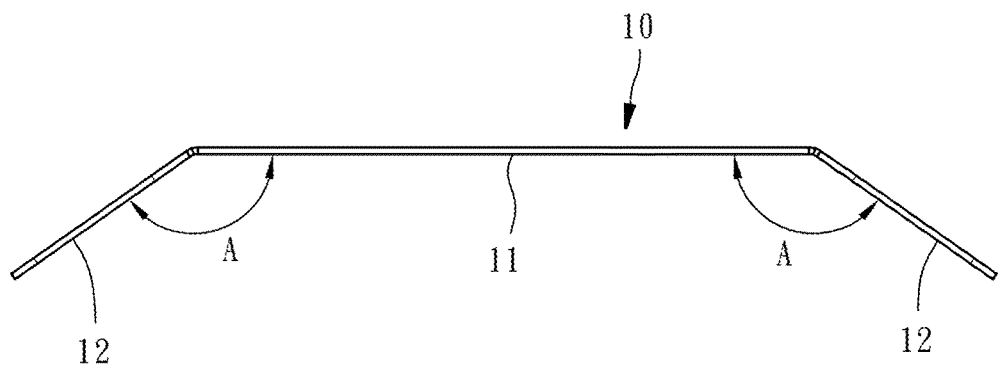
FIG. 4 is a top view of a back element according to a preferred embodiment of the present disclosure.
Figure 5:
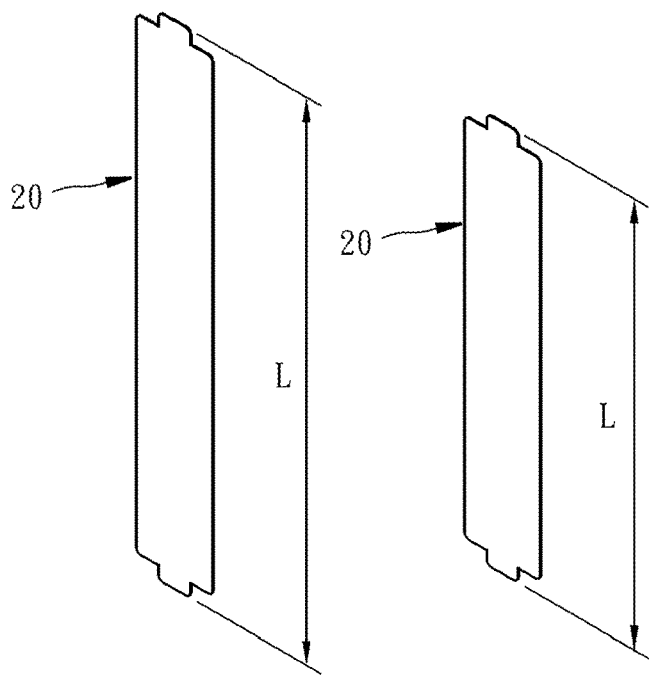
FIG. 5 is a perspective view of resilient bend plates according to a preferred embodiment of the present disclosure.
Figure 6:
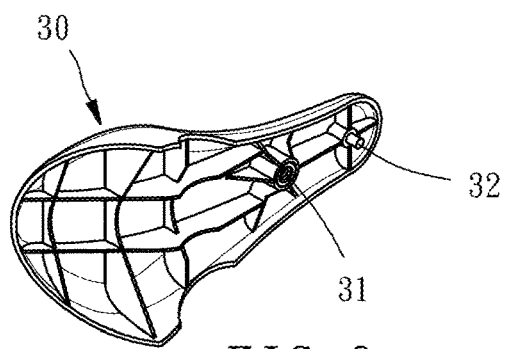
FIG. 6 is a perspective view of a lateral support elements according to a preferred embodiment of the present disclosure.

The present disclosure is hereunder described with reference to the accompanying drawings and embodiments.

As shown in the diagrams, a preferred embodiment of the present disclosure provided a chairback support structure comprising a back element 10, a plurality of resilient bend plates 20, a plurality of lateral support elements 30, and a pad 40.

The back element 10 has a central back board 11 and two lateral back boards 12 extending from two lateral edges of the central back board 11, respectively. An included angle A is formed between the central back board 11 and each said lateral back board 12. In this embodiment, the central back board 11 and the two lateral back boards 12 are integrally formed.

The back element 10 has a plurality of insertion holes 13 disposed on the central back board 11 and a plurality of insertion holes 13 disposed on the two lateral back boards 12.

Each said insertion hole 13 of the back element 10 is of a width W1 and has two semicircular ends.

The back element 10 has a plurality of first slots 14 (two first slots 14 in this embodiment) disposed on the two lateral back boards 12, respectively.

The first slots 14 enable a coupling element (not shown) to be adjustably coupled to a chair frame (not shown).

The back element 10 further has a plurality of second slots 15. In this embodiment, the second slots 15 are parallel to the first slots 14.

The plurality of resilient bend plates 20 each have a bendable portion 21, two insertion portions 22 extending from two ends of the bendable portion 21, respectively, and two abutting portions 23 disposed at two ends of the bendable portion 21, respectively.

The two insertion portions 22 are insertable into the insertion holes 13 of the back element 10. The two abutting portions 23 are adapted to abut against the back element 10.

The two insertion portions 22 are each of a width W2. The abutting portions 23 are each of a width W3.

The width W2 of the insertion portions 22 is less than the width W1 of the insertion holes 13 of the back element 10 to facilitate the insertion. The width W3 of the abutting portions 23 is greater than the width W1 of the insertion holes 13 of the back element 10, rendering it easier to support the back element 10.

The resilient bend plates 20 are each of a length L. The resilient bend plates 20 are of different lengths L.
}

The ends of the insertion portions 22 are rounded or chamfered to facilitate the insertion.

The plurality of lateral support elements 30 each have a screw hole 31. The screw hole 31 works together with a bolt 39 which is fastened to any one of the first slots 14 of the back element 10. Each lateral support element 30 has a positioning post 32 for positioning the lateral support element 30 at any one of the second slots 15 of the back element 10.

The pad 40 covers the back element 10, resilient bend plates 20 and lateral support elements 30 and serves to come into contact with and thereby give support to the human back, with the support given to the human back from the left and right as well.

The resilient bend plates 20 are each selected by a user at will and adjustably mounted on the back element 10 to facilitate adjustment in the position, height and curvature of the human back resting-portion of the chairback of the chairback support structure, thereby achieving the objective of the present disclosure.

The pad 40 is also conducive to the achievement of the objective of the present disclosure.

In addition to the above embodiment, the present disclosure may be implemented by another embodiment as described below.

For example, the central back board 11 and the two lateral back boards 12 of the back element 10 do not form the included angle A therebetween. Instead, the back element 10 is flat or curved in its entirety.

Alternatively, either the location of the plurality of insertion holes 13 of the back element 10 is restricted to the central back board 11, or the location of the plurality of insertion holes 13 of the back element 10 is restricted to the two lateral back boards 12.

Alternatively, coupling adjustably the back element 10 to a chair frame (not shown) is not necessarily attained by the first slots 14 and a coupling element (not shown). Instead, the back element 10 is either coupled adjustably to a chair frame (not shown) by the second slots 15 and a coupling element (not shown) or coupled adjustably to a chair frame (not shown) by any other part of the back element 10 in whatever manner as appropriate.

Furthermore, the chairback support structure does not necessarily include the lateral support elements 30.

In conclusion, the chairback support structure of the present disclosure is advantageous in that the resilient bend plates 20 are each selected by a user at will and adjustably mounted on the back element 10 to facilitate adjustment in the position, height and curvature of the human back resting-portion of the chairback of the chairback support structure, thereby achieving the objective of the present disclosure.

What is claimed is:

1. A chairback support structure, comprising:
   a back element (10) having a plurality of insertion holes (13);
   a plurality of resilient bend plates (20) each having a bendable portion (21), two insertion portions (22) extending from two ends of the bendable portion (21), respectively, and two abutting portions (23) disposed at two ends of the bendable portion (21), respectively, the two insertion portions (22) being insertable into the insertion holes (13) of the back element (10), and the two abutting portions (23) being adapted to abut against the back element (10); and
   a pad (40) for covering the back element (10) and the resilient bend plates (20).

2. The chairback support structure of claim 1, wherein the back element (10) has a central back board (11) and two lateral back boards (12) extending from two lateral edges of the central back board (11), respectively.

3. The chairback support structure of claim 2, wherein an included angle (A) is formed between the central back board (11) and each said lateral back board (12).

4. The chairback support structure of claim 2, wherein the insertion holes (13) of the back element (10) are disposed on the central back board (11).

5. The chairback support structure of claim 4, wherein the insertion holes (13) of the back element (10) are disposed on the two lateral back boards (12).

6. The chairback support structure of claim 2, wherein the insertion holes (13) of the back element (10) are disposed on the two lateral back boards (12).

7. The chairback support structure of claim 1, wherein the resilient bend plates (20) are of different lengths (L).

8. The chairback support structure of claim 1, further comprising a plurality of lateral support elements (30) mounted on the back element (10).

9. The chairback support structure of claim 8, wherein the back element (10) has a plurality of first slots (14) which the lateral support elements (30) are mounted on, respectively.

10. The chairback support structure of claim 9, wherein the back element (10) further has a plurality of second slots (15), and each said lateral support element (30) has a positioning post (32) positioned at any one of the second slots (15) of the back element (10).

\* \* \* \* \*